(No Model.)

S. H. JENNINGS.
AUGER BIT.

No. 433,683. Patented Aug. 5, 1890.

Witnesses.
J. H. Shumway
Lillian D. Kelsey

Simeon H. Jennings.
Inventor
By Attys
Earle Seymour

UNITED STATES PATENT OFFICE.

SIMEON H. JENNINGS, OF DEEP RIVER, CONNECTICUT.

AUGER-BIT.

SPECIFICATION forming part of Letters Patent No. 433,683, dated August 5, 1890.

Application filed April 4, 1890. Serial No. 346,570. (No model.)

*To all whom it may concern:*

Be it known that I, SIMEON H. JENNINGS, of Deep River, in the county of Middlesex and State of Connecticut, have invented a new Improvement in Auger-Bits; and I do hereby declare the following, when taken in connection with accompanying drawings and the letters of reference marked thereon, to be a full, clear, and exact description of the same, and which said drawings constitute part of this specification, and represent, in—

Figure 1:
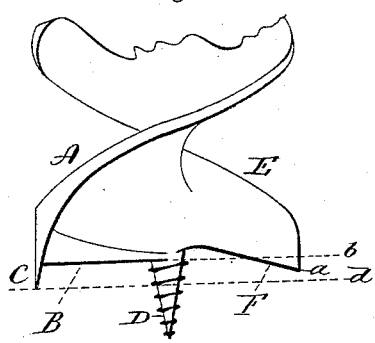
Figure 2:
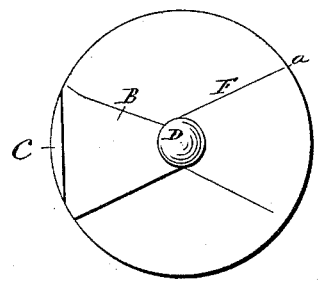

Figure 1, a side view looking upon the cutting-edge of the floor-lip F and upon the back of the floor-lip B; Fig. 2, an end view of the same.

This invention relates to an improvement in auger-bits such as used by carpenters and others for boring wood. In the more general construction of this class of augers the floor-lips are in a plane at substantially right angles to the axis of the auger, so that they both stand in substantially the same horizontal plane. The lips are usually provided with a spur, which makes a circular cut in advance of the lip, so that the chip cut by the floor-lip may clear from the wood. These chips are circular and usually divided centrally in the grain of wood, so that each chip will be a semicircular disk. The spur is necessarily thicker at the floor-lip than at the edge, so that it is of wedge shape. This spur, therefore, works with very considerable friction in the cut which it makes, it having to force its way simply by its wedge shape. The spur, therefore, while necessary to the proper working of the floor-lip, adds greatly to the friction of the working of the auger, which friction increases as the wood is harder. The chips, as I have described, are large, and are obliged to force their way through the twist of the auger, and, being so large, they unavoidably choke the passage to a greater or less extent, and produce so great a friction upon the auger that it is necessary in boring a hole of any considerable depth to frequently withdraw the auger to clear the same.

In an invention of Henry L. Shaler, patented October 29, 1889, No. 413,972, issued to myself and said Shaler as assignees, an improvement was made to obviate the difficulties above mentioned. That improvement consisted in forming one of the lips with a gouge, the width of the gouge being less than the width of the floor-lip, so that the gouge of one lip will cut a groove following the other floor-lip, and so that as the said other floor-lip follows the gouge it cuts across this groove, and so that the chips cut by this other floor-lip will be divided. The gouge having an advance cut to a depth considerably greater than the following floor-lip, removes its chip independent of that cut by the floor-lip. The groove thus formed by the gouge consequently reduces to a very great extent the size of the chip, and thereby allows the more ready clearance of the auger; but in that construction there is the same depth of cut to be made by the spur, because the gouge-lip starts in on the plane of the floor-lip, and its cut falls back from the periphery of the hole, leaving solid wood through which the spur must run to its full depth. The removal of a portion of the wood inside the cut made by the spur to some extent relieves that friction, because it permits the wood to be more readily forced inward than it otherwise would be, but yet there is unavoidably a very considerable friction upon the spur.

The object of my invention is to embody the advantages of the division of the chip provided for in the said Shaler patent, but at the same time to make the dividing-cutter work close to the periphery of the hole, so as to remove substantially that portion of the wood which was left by the gouge-lip around the periphery of the hole, and whereby a smooth cut will be produced; and the invention consists in a double-twist auger having one floor-lip in substantially a horizontal plane and provided with a spur, the second floor-lip being in a plane oblique to the plane of the said first floor-lip, so that its outer edge will cut to the extreme periphery below the plane of the said first floor-lip, the second floor-lip inclining upward, so that its plane crosses the plane of the said first floor-lip, as more fully hereinafter described.

The shank and twist of the auger are of usual construction, the twist being double. One twist A terminates in a floor-lip B in substantially a horizontal plane. That lip is provided with the usual spur C, and the auger at its center is provided with the usual screw D. The other twist E terminates in a lip F; but this lip F, instead of being horizontal like the lip B, is in a plane oblique to the plane of the floor-lip B, the lip extending to the periphery so that its outer edge at the periphery is below the plane of the floor-lip, the plane of the floor-lip B being indicated by the broken line *b;* but this point *a* of the floor-lip F is above the cutting-edge of the spur C, the broken line *d* indicating the plane of the edge of the said spur, the point *a* of the floor-lip being preferably midway between the said two planes *b d*, as clearly seen in Fig. 1. From this point *a* the floor-lip F extends upward obliquely and crosses the plane *b* of the floor-lip and runs to the center in a plane above the said plane *b*, so that the cut of the floor-lip F is diagonally across the plane of the cut of the floor-lip B, but yet the cut made by the floor-lip F extends to the periphery and cuts below the plane of the cut of the floor-lip B. By this construction the floor-lip F cuts in advance of the spur, the previous revolution having caused the spur to cut to a depth slightly greater than the depth of the cut of the floor-lip F, so that the wood is removed around the periphery to a depth nearly equal to the depth of the cut of the spur and so that as the spur follows this diagonal cut it meets but slight resistance—that is, but a slight depth is required to be cut. Consequently the friction upon that spur is very light.

The floor-lip F cuts in advance of the floor-lip B and in a plane diagonal to the plane of the cut of the floor-lip B, the outer portion of the cut of the floor-lip F being below the cut of the floor-lip B, so that as the floor-lip B advances it has only to cut that portion of the wood from the center outward where the plane of the cut of the floor-lip B crosses the plane of the cut of the floor-lip F. Therefore the floor-lip will cut a chip from the outside of the hole inward, say, to about one half the radius of the hole. Then the floor-lip B following, will cut the other half. The chip being thus divided, so reduces the size of the chip that it readily follows the twist of the auger without liability of clogging.

The incline of the lip F is only necessary to extend up and across the cutting-plane of the lip B, and from that point above it may run to the center straight or curved, as shown. By this construction I obtain all the advantages of the division of the chip described in the said Shaler patent, at the same time the wood is removed in advance of the spur, whereby the friction, which must necessarily exist in the use of the auger of the said Shaler patent, is substantially, or to a very considerable extent, removed. Either or both floor-lips may be provided with the usual side or vertical cutter above the lip. (Not shown.)

From the foregoing it will be understood that I herein claim nothing shown or described in the said Shaler patent; but What I do claim is—

A double-twist auger-bit constructed with a horizontally-cutting floor-lip B on one twist and with a spur C, the other twist terminating in a floor-lip F in a plane oblique to the plane of the said floor-lip B, the said plane of the floor-lip F starting from the periphery at a point below the plane of the cut of the floor-lip B and running therefrom obliquely upward so as to cross the said plane of cut of the floor-lip B, substantially as described.

SIMEON H. JENNINGS.

Witnesses:
 FRED C. EARLE,
 LILLIAN D. KELSEY.